United States Patent Office 3,314,960
Patented Apr. 18, 1967

3,314,960
BENZISOTHIAZOL GLUTARIMIDES
Meier E. Freed and Scott J. Childress, Philadelphia, Pa., assignors to American Home Products Corporation, New York, N.Y., a corporation of Delaware
No Drawing. Filed Aug. 25, 1964, Ser. No. 392,029
6 Claims. (Cl. 260—281)

This invention relates to glutarimides and more specifically relates to 2-(1,1,3-trioxo-1,2-benzisothiazol-2-yl) glutarimides and to the method by which these novel compounds are prepared.

The new compounds of the present invention considered in their broadest aspect include those encompassed within the following formula:

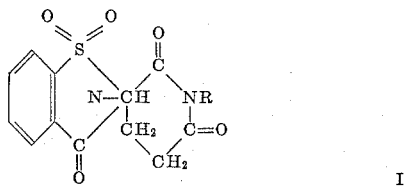

I wherein R is selected from the group consisting of hydrogen, lower alkyl and lower aralkyl.

The new compounds of the present invention are prepared by reacting an α-haloglutarate with o-sulfobenzimide in the presence of an inert solvent to provide a α-o-sulfobenzimidoglutarate. The latter compound in then treated with concentrated mineral acid to convert the glutarate to the glutaric acid form. Reacting the latter with a suitable reagent such as acetonitrile brings about ring closure and the formation of the desired glutarimide corresponding to that included within Formula I, wherein R is hydrogen.

The novel method of preparation of this invention is more clearly shown in the following reaction sequence:

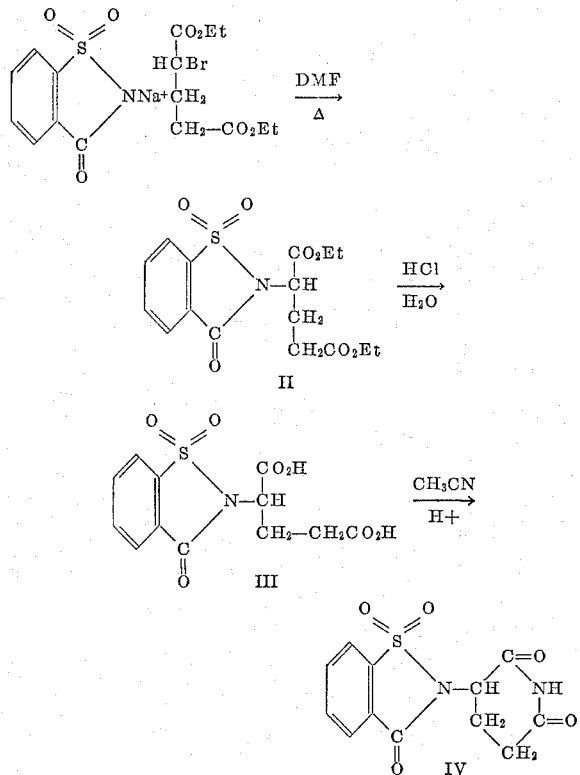

According to the foregoing sequence a suitable dialkyl α-haloglutarate such as the diethyl α-bromoglutarate shown is added to a stirred solution of an alkali metal-o-sulfobenzimide in an inert solvent such as dimethylformamide, toluene or the like. The mixture is heated at a temperature of about 100° for a period of from 5 to about 10 hours. The reaction mixture is thereafter extracted with ether and the solvent later removed by distillation, providing after further work-up, the diethyl-α-o-sulfobenzimidoglutarate (II) shown. By treating the latter with concentrated mineral acid such as hydrochloric acid, under reflux for a period of from ½ to 2 hours, then cooling and filtering the glutaric acid product (III) is obtained. Additional product may be recovered by extracting the aqueous acid solution with ether, drying the solution, removing the ether and triturating the residue with chloroform.

The product, α-o-sulfobenzimido glutaric acid (III), is then reacted with acetonitrile in a suitable container, such as a pressure bomb, at a temperature of from about 170–190° C. from a period of from 4 to about 8 hours. The mixture is then cooled and filtered. The filtrate is concentrated to dryness and the residue dissolved in hot methanol. On cooling there is provided the desired 2-(1,1,3-trioxo-1,2-benzisothiazol-2-yl) glutarimide (IV). In order to prepare the additional compounds encompassed within those defined by Formula I where R is lower alkyl or lower aralkyl it is necessary to convert the product (IV) to the sodium salt according to conventional practice and thereafter alkylate the same with a suitable agent such as an alkyl halide or an aralkylhalide.

The new compounds of the present invention have been found to possess properties which make them useful as sedatives. More particularly the new compounds of the present invention have been found to possess both depressant and mydriatic properties and are therefore useful for such purposes.

When used for such purposes, in particular when used for sedative purposes, the compounds of this invention may be administered alone or in combination with pharmaceutically acceptable carriers, in proportions which are determined by the solubility of the selected compound and the chosen route of administration.

When the new compounds of this invention are so prepared they may be administered orally in the form of tablets or capsules, containing such excipients as starch and milk sugar. They may also be adminstered in other forms as well, under which circumstances sugar, syrups, flavoring agents and dyes may also be present. The new compounds may also be injected parenterally, preferably in composition form.

The dosage amount in which these new compounds will be used will vary with the form of administration anticipated and the particular compound chosen. The dosage will also vary with the particular subject of treatment and the effect desired. Normally treatment is started with small dosage amounts, substantially less than what may be an optimum dose, and thereafter increased in small dosage increments until an optimum or maximum effect is obtained. It will generally be found that when the composition is administered orally, larger quantities of the agent will be required to produce the same effect that a small quantity does when administered parenterally.

Generally speaking, the new compounds of the present invention are useful in the same manner and amount as known agents having a similar function and effect. The dosage amount may be varied from as little as 5 to as much as 500 mg. per day and of course may be administered in different dosage unit amounts and forms as has been suggested. Tablets containing from 10 to 200 mg. of the active agent have been found to be particularly convenient.

Reference now to the specific example which follows will provide a better understanding of the new compounds of the present invention as well as the novel method by which these new compounds are prepared.

*Example*

Diethyl α-bromoglutarate (292.5 g., 1.1 mole) is added to a well stirred solution of sodium o-sulfobenzimide (452 g., 2.2 mole) in 1500 ml. of dimethylformamide. The mixture is stirred and heated at 100° C.* for 8 hrs. After cooling, the reaction mixture is poured into 6 l. of water and extracted into either. The ether layer is washed with saline and dried over sodium sulfate. After filtering and removing the solvent the residue is transferred to a distillation apparatus and materials boiling below 190°/.2 mm. were removed by distillation. Heating is discontinued after the product (B.P. 190–205/.2 mm.) begins to solidify in the condensor. The product remaining in the pot is taken up in ether and allowed to stand over Norite.** After filtering clear, the filtrate is placed in the cold overnight. The crystalline product diethyl-α-o-sulfobenzimidoglutarate is filtered off, washed with ether, and dried. Yld. 206.5 g. (51%). M.P. 66–67.5°.

*Analysis.*—Calcd. for $C_{16}H_{19}NSO_1$: C, 52.01; H, 5.19; N, 3.79; S, 8.66. Found: C, 51.83; H, 4.92; N, 3.66; S, 9.00.

\* All temperatures are centigrade unless otherwise noted.
\*\* Trademark.

The diethyl α-o-sulfobenzimidoglutarate (20 g.) is suspended by stirring in 75 ml. of concentrated hydrochloric acid and heated under reflux for 1 hr. After cooling the supernatant is decanted from the insoluble material. This is again refluxed with 50 ml. of concentrated hydrochloric. After 15–20 min. of heating a white solid forms. The reaction mixture is cooled, and the product filtered from the solution. After washing with water and drying this yielded 12 gm. of product, M.P. 220–222°. The combined aqueous acid solution is diluted with water and extracted with ether. The ether solution is washed with saline and dried. After removing the ether the residue is triturated with chloroform. The solid α-o-sulfobenzimidoglutaric acid is filtered off, washed, and dried. Yld. 2 g. Total yld. 14 g. (83%). A sample recrystallized from acetonitrile shows a melting point of 225–228°.

*Analysis.*—Calcd. for $C_{12}H_{11}NO_7S$: C, 46.00; H, 3.54; N, 4.47; S, 10.22. Found: C, 46.05; H, 3.55; N, 4.43; S, 10.25.

A suspension of α-o-sulfobenzimido glutaric acid (3 g.) in 30 ml. of acetonitrile containing 0.1 ml. of concentrated sulfuric acid is placed in a metal bomb and heated at 180° for 6 hrs. After cooling, the contents of the bomb are transferred to a flask and filtered free of insoluble material. The filtrate is concentrated to dryness under reduced pressure and the residue dissolved in hot methanol. On cooling, the product α-o-sulfobenzimidoglutaric acid crystallizes and is filtered off. The product is then recrystallized from acetonitrile. Yld. 1 g., M.P. 264–265°.

*Analysis.*—Calcd. for $C_{12}H_{10}N_2O_5S$: C, 48.98; H, 3.43; N, 9.52; S, 10.88. Found: C, 49.07; H, 3.22; N, 9.58; S, 10.55.

As has been previously suggested in order to prepare the compounds encompassed within formula (I) upon converting the final product obtained above the sodium salt and thereafter alkylating the same there is obtained by use of the appropriate alkylating agent the following compounds, N-ethyl-[2-(1,1,3-trioxo-1,2-benziso-thiazol-2-yl)]glutarimide, N-propyl-[2-(1,1,3-trioxo-1,2-benziso-thiazol-2-yl)]glutarimide, and N-benzyl-[2-(1,1,3-trioxo-1,2-benziso-thiazol-2-yl)]glutarimide.

While the present invention has been described with some degree of particularity it is to be understood that such description is not intended in any manner to be construed as a limitation on the scope of the invention. The invention is to be limited only by the claims appended hereto.

The invention claimed is:
1. A compound having the formula

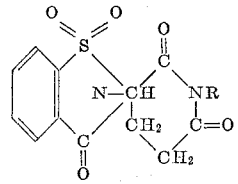

I wherein R is selected from the group consisting of hydrogen, lower alkyl and lower aralkyl.
2. 2-(1,1,3-trioxo-1,2-benzisothiazol-2-yl) glutarimide.
3. N-ethyl-[2-(1,1,3 - trioxo-1,2-benziso-thiazol-2-yl)] glutarimide.
4. N-propyl-[2-(1,1,3 - trioxo - 1,2 - benziso-thiazol-2-yl)]glutarimide.
5. N-benzyl-[2-(1,1,3 - trioxo - 1,2 - benziso-thiazol-2-yl)]glutarimide.
6. The method of preparing a compound having the formula

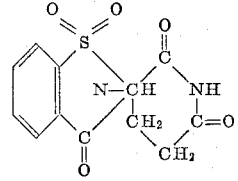

which comprises reacting dialkyl α-haloglutarate with a solution of an alkali metal o-sulfobenzimido in the presence of an inert solvent, treating the intermediate o-sulfobenzimido glutarate obtained with strong mineral acid and reacting the sulfobenzimidoglutaric acid obtained with acetonitrile to provide the desired product.

No references cited.

ALEX MAZEL, *Primary Examiner.*
DONALD G. DAUS, *Assistant Examiner.*

UNITED STATES PATENT OFFICE
CERTIFICATE OF CORRECTION

Patent No. 3,314,960                                   April 18, 1967

Meier E. Freed et al.

It is hereby certified that error appears in the above numbered patent requiring correction and that the said Letters Patent should read as corrected below.

Column 1, lines 16 to 23, and column 4, lines 18 to 26, the formula should appear as shown below instead of as in the patent:

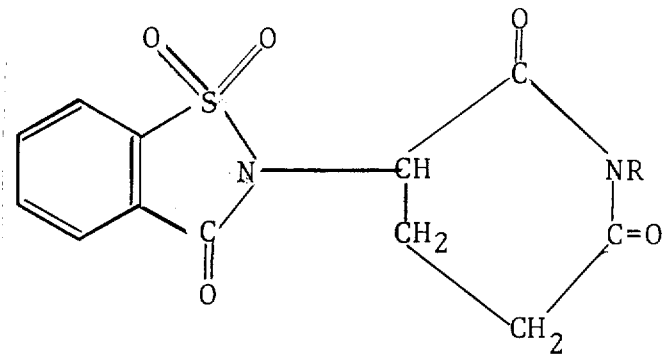

column 4, lines 40 to 45, the formula should appear as shown below instead of as in the patent:

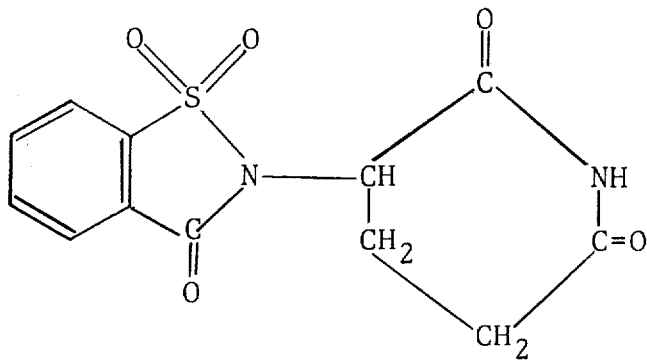

Signed and sealed this 28th day of November 1967.

(SEAL)
Attest:

EDWARD M. FLETCHER, JR.                        EDWARD J. BRENNER
Attesting Officer                                    Commissioner of Patents